Patented Aug. 11, 1925.

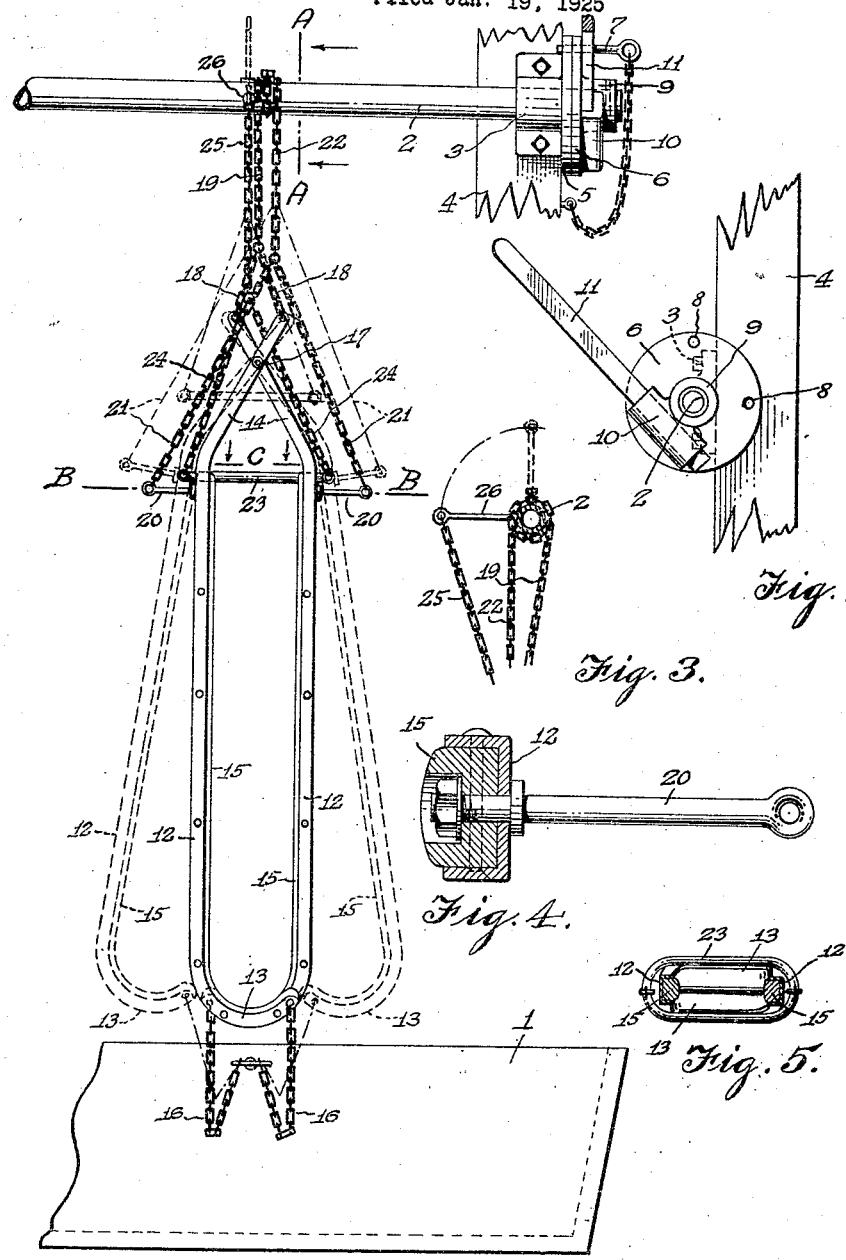

1,549,245

UNITED STATES PATENT OFFICE.

WILLIAM E. CURRIE, OF DETROIT, MICHIGAN.

CATTLE STANCHION.

Application filed January 19, 1925. Serial No. 3,287.

*To all whom it may concern:*

Be it known that I, WILLIAM E. CURRIE, a citizen of the United States, residing at Detroit, in the county of Wayne and State of Michigan, have invented certain new and useful Improvements in Cattle Stanchions, of which the following is a specification, reference being had therein to the accompanying drawings.

Stanchions or neck yokes have been extensively used in cattle bars and stables for retaining cattle in the stalls. Ordinarily the stanchions or yokes include a pair of neck members movable relative to each other and when in open positions providing openings between the upper ends of the neck members and cattle are supposed to place their necks in these openings in order to obtain feed at a manger, at which time the neck members are closed. When cattle enter a barn and stalls the heads are ordinarily lowered, looking for feed, and it is somewhat unnatural for the cattle to raise their heads and place their necks in the stanchions, particularly when the mangers are low and there are wide openings between adjacent stanchions. If the stanchions have wide openings at the upper ends thereof with the neck members of each stanchion assuming somewhat of a V formation, it is obvious there are wide openings between the neck members of adjacent stanchions and it is nothing more than natural for cattle to place their heads through such opening, even though trained to do otherwise.

My invention, in its broadest aspect, involves stanchion neck members, which when in open positions provide wide bottom openings through which may extend their heads to reach the feed in a manger. The openings being at the lower ends of the stanchions, in contradistinction to upper end openings, mentioned above a stanchion condition is provided to accommodate the position of a cow's head upon entering the stall, consequently delays are avoided incident to securing cattle in stalls preparatory to milking conditions.

My invention further aims to provide a simple, durable and inexpensive stanchion embodying a scissors-like arrangement of neck members having the lower ends thereof loosely articulated relative to a manger and the upper ends thereof suspended from an operating shaft or arbor by which a multiplicity of the stanchions may be actuated in synchronism.

My stanchion will be hereinafter specifically described and then claimed and reference will now be had to the drawing, wherein Figure 1 is a front elevation of the stanchion in a closed position and showing the neck members in an open position by dash lines;

Fig. 2 is an end view of a stanchion operating shaft or arbor;

Fig. 3 is a cross sectional view taken on the line A—A of Fig. 1;

Fig. 4 is an enlarged horizontal sectional view of one of the neck members, for instance on the line B—B of Fig. 1, and Fig. 5 is a horizontal sectional view taken on the line C of Fig. 1.

In the drawing, the reference numeral 1 denotes a manger or feed receptacle and in a plane above this manger and farther in a cow's stall than said manger, is a rock shaft or arbor 2 that may be supported in bearings 3 carried by one or more uprights 4 adjacent the manger 1 or at the ends of a row of cow stalls the shaft or arbor 2 being adapted to control one or more stanchions. The bearing 3 has an apertured face plate 5 and the shaft 2 is provided with an apertured face plate 6 confronting the face plate 5 and adapted to be held thereby when a pin 7 is placed in the apertures of the face plate 5. The face plate 6 may have a plurality of apertures 8 so that after the shaft 2 is rocked it may be secured in an adjusted position. The face plate 6 is carried by a hub 9 fixed on the shaft 2 and said hub is provided with a socket 10 for a lever 11 which may be manipulated by an operator to rock the shaft 2 and open or close one or more stanchions associated with said shaft.

Each stanchion includes two opposed scissors-like neck members arranged in opposed relation and adapted to form an oblong neck yoke which is suspended from the shaft 2 and loosely articulated to the manger 1. Each stanchion member comprises a channel bar 12 having a lower curved end 13 and an upper angular end 14. These channel bars are arranged with the channels thereof confronting each other and mounted in said channels and extending into the curved lower ends of the bars 12 are neck engaging pieces 15, preferably made of wood or a material that will not injure the animal's neck.

The lower curved ends of the bars 12 are loosely connected by chains or other flexible members 16 to the manger 1 and the upper angular ends 14 of said bars are fashioned for intersection and pivotal connection, as at 17, whereby the stanchion members will have comparatively long parallel lower ends and short upper ends, which by virtue of the pivotal connection 16 afford greater movement of the lower ends of the members than the upper ends thereof when the stanchion is opened or closed.

The upper short ends of the bars 12 are apertured and connected to the branches 18 of a chain 19 or other flexible member which is attached to and wound on the shaft 2 so that when said shaft is turned in a counter-clockwise direction the upper ends of the stanchion members are drawn towards each other causing a similar movement of the lower ends and closing of the stanchion.

Where the rails 12 are bent to form the upper angular ends 14 said rails are provided with outwardly extending opposed arms 20 which may be in the form of eye bolts mounted in each bar and the neck engaging piece therein. Attached to the outer eye ends of the arms 20 are the branches 21 of another chain 22 or flexible member attached to and wound on the shaft 2 so that when said shaft is rotated in a clockwise direction the lower ends of the bars 12 will be swung outwardly to an open position as shown in dash lines, Fig. 1. The lower curved ends 13 of the bars 12 will be brought into overlapped relation so as to form an oblong yoke in which the neck of a cow may be retained, at the same time allowing neck movement for feeding purposes.

Loosely mounted on the stanchion members above the arms 20 is an oblong ring or locking member 23 and attached thereto are the branches 24 of a chain 25 or other flexible member which is attached to a radial arm 26 carried by the shaft 2, said arm being of sufficient length to permit of the locking member 23 moving in advance of the upper ends of the stanchion members. The locking member is adapted to fit down over the stanchion members, as shown in Fig. 1, to retain said members in a closed position, and when the shaft 2 is rocked to open the stanchion members the locking member 23 is sufficiently elevated to permit of such opening movement taking place. The locking member is adapted to descend by gravity when the shaft 2 is rocked to close the stanchion members, and by using flexible members to articulate the stanchion relative to the manger 1 and the shaft 2 there is sufficient freedom of movement for an animal in a stall to permit of the animal lying down or otherwise maneuvering without leaving the stall. It is obvious that the locking member may be lifted with the fingers to release a cow, if desired, independent of the rock shaft.

By observing Fig. 1, it will be noted that when the stanchion members are in an open position that a wide opening exists adjacent the manger and this opening is at such elevation that a cow entering the stall naturally inserts the head through the opening, such opening being in a more natural position for the cow than openings between adjacent stanchions. In consequence of this constructive arrangement of parts there is greater assurance of cattle being in position to be held by stanchions when the shaft 2 is rocked, therefore considerable time and labor may be saved when comparing my stanchion with that type in which cattle are often free on account of not having their necks in proper yoke or stanchion positions.

One embodiment of my invention has been illustrated, but it is to be understood that the structural elements are susceptible to such variations and modifications as fall within the scope of the appended claims.

What I claim is:—

1. A stanchion of the character described comprising stanchion members having a configuration which afford a yoke, said members being pivotally connected adjacent the upper ends thereof so that said members may be actuated to either open or close said yoke, said members in an open position affording a large opening between said members at the lower ends thereof, and means supporting said stanchion members and adapted for actuating said stanchion members.

2. An animal stanchion comprising opposed members having lower curved ends and upper angular ends, pivotal means connecting the upper angular ends of said opposed members so that the upper ends of said opposed members may be actuated to shift the lower ends of said opposed members to provide a wide head and neck receiving opening between the lower ends of said opposed members, and means to facilitate actuating said opposed members.

3. An animal stanchion as called for in claim 2, wherein said means includes a rock shaft and flexible members connecting said rock shaft and opposed members with said flexible members arranged one the reverse of the other relative to said rock shaft.

4. An animal stanchion comprising opposed members having lower curved ends and upper angular ends, pivotal means connecting the upper angular ends of said opposed members so that the upper ends of said opposed members may be actuated to shift the lower ends of said opposed members to provide a wide head and neck receiving opening between the lower ends of said opposed members, shiftable locking means on the upper ends of said opposed members adapted for holding said opposed members in the form of a closed neck yoke, and actuating means for said pivoted opposed members adapted for opening and closing said members.

5. An animal stanchion as called for in claim 4, wherein said locking means includes a ring and a member by which said ring may be shifted.

6. An animal stanchion as called for in claim 4, wherein said actuating means includes a rock shaft articulated with said opposed members, said rock shaft also serving to shift said locking means.

7. An animal stanchion comprising a neck yoke composed of bars having upper pivotally connected ends and lower adjacent ends, and means connected to the upper ends of said bars adapted to shift both bars to spread the lower bar ends and form a wide head and neck receiving opening.

8. An animal stanchion as called for in claim 7, wherein said means includes a rock shaft, flexible members attached to said bars and attached to and wound on said rock shaft.

9. An animal stanchion as called for in claim 7, wherein said means includes a rock shaft, flexible members attached to said bars and attached to and wound on said rock shaft, and means for securing said shaft in an adjusted position.

In testimony whereof I affix my signature.

WILLIAM E. CURRIE.